(12) United States Patent
Chung et al.

(10) Patent No.: US 10,947,634 B2
(45) Date of Patent: Mar. 16, 2021

(54) METHOD FOR PREPARING INVISIBLE ANODIC ALUMINUM OXIDE PATTERN

(71) Applicant: NATIONAL CHENG KUNG UNIVERSITY, Tainan (TW)

(72) Inventors: Chen-Kuei Chung, Tainan (TW); Yun Chen, Tainan (TW); Chung-Yu Yu, Tainan (TW)

(73) Assignee: National Cheng Kung University, Tainan (TW)

( * ) Notice: Subject to any disclaimer, the term of this patent is extended or adjusted under 35 U.S.C. 154(b) by 93 days.

(21) Appl. No.: 16/169,051

(22) Filed: Oct. 24, 2018

(65) Prior Publication Data
US 2020/0131659 A1 Apr. 30, 2020

(51) Int. Cl.
*C25D 11/18* (2006.01)
*C25D 11/04* (2006.01)
*B01D 67/00* (2006.01)
*B01D 71/02* (2006.01)
*C25D 11/06* (2006.01)

(52) U.S. Cl.
CPC ........ *C25D 11/045* (2013.01); *B01D 67/0065* (2013.01); *B01D 71/025* (2013.01); *C25D 11/06* (2013.01)

(58) Field of Classification Search
None
See application file for complete search history.

(56) References Cited

U.S. PATENT DOCUMENTS

| | | | | |
|---|---|---|---|---|
| 3,857,766 A * | 12/1974 | Woods | ............... | C25D 11/04 205/108 |
| 6,342,145 B1 * | 1/2002 | Houssian | ............... | C25D 11/12 205/122 |
| 8,183,082 B1 * | 5/2012 | Lewis | ............... | H01L 27/301 438/73 |
| 8,992,696 B2 * | 3/2015 | Walker | ............... | B22D 19/04 148/285 |
| 2006/0194433 A1 * | 8/2006 | Saito | ............... | C25D 11/24 438/688 |

(Continued)

FOREIGN PATENT DOCUMENTS

| | | |
|---|---|---|
| TW | I444507 B | 7/2014 |
| TW | I553165 B | 10/2016 |

(Continued)

OTHER PUBLICATIONS

Li et al., "The effect of high-temperature annealing on optical properties of porous anodic alumina formed in oxalic acid", Luminescence, 2007, 22, 355-361. (Year: 2007).*

(Continued)

*Primary Examiner* — Stefanie S Wittenberg
(74) *Attorney, Agent, or Firm* — Rosenberg, Klein & Lee

(57) ABSTRACT

A method for preparing invisible anodic aluminum oxide (AAO) patterns is revealed. The method includes a plurality of steps. First take an aluminum substrate. Then anodize the aluminum substrate for the first time to get a first anodic aluminum oxide (AAO). Next perform photolithography so that a photoresist forms a pattern on the aluminum substrate with the first AAO. Lastly anodize the aluminum substrate for the second time so that a second AAO is formed on the pattern and the pattern becomes invisible.

11 Claims, 3 Drawing Sheets

(56) References Cited

U.S. PATENT DOCUMENTS

| | | | | |
|---|---|---|---|---|
| 2008/0274375 A1* | 11/2008 | Ng | ............... | C25D 11/08 |
| | | | | 428/687 |
| 2011/0181169 A1* | 7/2011 | Eden | ............... | H01J 61/86 |
| | | | | 313/231.31 |
| 2013/0153428 A1* | 6/2013 | Akana | ............... | C25D 11/20 |
| | | | | 205/50 |
| 2013/0319865 A1* | 12/2013 | Browning | ............... | H05K 5/02 |
| | | | | 205/50 |
| 2016/0060783 A1* | 3/2016 | Curran | ............... | C25D 11/12 |
| | | | | 205/50 |

FOREIGN PATENT DOCUMENTS

| | | | | |
|---|---|---|---|---|
| TW | 201809367 A | | 3/2018 | |
| WO | WO2017112843 | * | 6/2017 | ............ H01L 21/02 |

OTHER PUBLICATIONS

Stevenson Jr. et al. "Anodizing" ASM Handbook, vol. 5: Surface Engineering, p. 482-493, 1994. (Year: 1994).*

Yin et al. "Fabrication and characterization of aluminum oxide thin film micropatterns on the glass substrate" Microelectronic Engineering, 128, p. 66-70, 2014). (Year: 2014).*

Office Action and Search Report for Taiwanese Patent Application No. 107131601 (counterpart application), dated Apr. 24, 2019.

* cited by examiner

METHOD FOR PREPARING INVISIBLE ANODIC ALUMINUM OXIDE PATTERN

BACKGROUND OF THE INVENTION

Field of the Invention

The present invention relates to a method for preparing invisible anodic aluminum oxide (AAO) patterns, especially to a method for preparing invisible AAO patterns in which patterns formed by photolithography become invisible after two times of anodizing. This is owing to specific optical property of AAO. The patterns that are unable to be recognized easily can be attached on a surface of various objects so that the patterns can be used as security patterns for improving information security.

Description of Related Art

With the developing technology, counterfeiters copy/imitate the design and produce goods as soon as new products are available on the market. Generally, users are unable to distinguish counterfeits from the genuine products owing to similarity in appearance. Thus an anti-counterfeiting label with complicated design is disposed on the package. A plurality of information such as serial numbers, barcodes or patterns is integrated into the anti-counterfeiting label. Thus people can get all the information only by viewing the anti-counterfeiting label at different angles. Thereby the anti-counterfeiting label is difficult for counterfeiters to reproduce. The most common anti-counterfeiting label is produced by using ink or lasers to print patterns on plastic films.

The patterns formed by ink can not only change colors by means of light but also become invisible by invisible/security ink. After being radiated by light with specific wavelength, the pattern is made visible. The pattern also becomes visible by changes of temperature. The ink printing can not only be applied to labels but also to paper documents. Refer to U.S. Pat. No. 9,747,483, methods for securing invisible 2D barcodes and printed images are revealed. A secure document includes a fluorescent barcode and a fluorescent filler printed onto a substrate. The fluorescent barcode is printed using a first fluorescent ink of a first color and the fluorescent filler is printed using a second fluorescent ink of a second color that is different than the first color. In order to read the fluorescent barcode, the secure document must be illuminated with ultraviolet and/or infrared light. Then, a color filter must be used to filter the fluorescent filler out, leaving the fluorescent barcode visible.

In this prior art, documents are printed using invisible inks and visible inks. The hidden information is made visible by viewing under light with specific wavelength. The color filter is used to filter the unnecessary part out and only the information required is left. Although the ink printing technique or laser printing technique available now can make patterns printed become invisible to human eyes, the patterns are easy to be deteriorated and only able to be printed on specific materials. Thus there is room for improvement and there is a need to provide a novel method used for preparing invisible patterns and able to be applied to most of materials.

SUMMARY OF THE INVENTION

Therefore it is a primary object of the present invention to provide a method for preparing invisible anodic aluminum oxide (AAO) patterns by which a pattern is formed on an aluminum film, an aluminized film or an aluminum alloy film and becoming invisible by anodizing so as to add anti-counterfeiting feature and improve information security.

In order to achieve the above object, a method for preparing invisible anodic aluminum oxide (AAO) patterns according to the present invention includes a plurality of steps. Step 1: take an aluminum substrate. Step 2: anodize the aluminum substrate for the first time to get a first anodic aluminum oxide (AAO). Step 3: perform photolithography so that a photoresist forms a pattern on the aluminum substrate with the first AAO. Step 4: anodize the aluminum substrate for the second time so that a second AAO is formed on the pattern and the pattern becomes invisible.

Preferably, the invisible pattern is further treated by annealing or pore-widening so that the invisible pattern can be later made visible.

Preferably, the invisible pattern treated by annealing can be made visible by ultraviolet (UV) light while the invisible pattern treated by pore-widening can be rendered visible by droplet addition.

Preferably, the annealing takes place in an annealing furnace at a temperature between 200 degrees Celsius (° C.) and 500° C. for 3-6 hours.

Preferably, the annealing temperature is 400° C. with the annealing time of 3 hours.

Preferably, the aluminum substrate is immersed in a phosphoric acid solution during the pore-widening.

Preferably, the concentration of the phosphoric acid solution is 1 wt %-20 wt % and the temperature thereof is 10° C.-45° C. The second anodic aluminum oxide (AAO) without being covered with the photoresist is treated by pore-widening for 30-1800 seconds.

Preferably, a layer of metal or alloy is electroplated on a surface of the aluminum substrate already treated by pore-widening. The metal and the alloy can be selected from the group consisting of platinum (Pt), aluminum (Al), silver (Ag), gold (Au), iron (Fe), nickel (Ni), cobalt (Co), chromium (Cr), titanium (Ti), tantalum, (Ta), copper (Cu) or their combinations.

Preferably, a layer of metal or alloy whose reflectivity is higher than 70% is electroplated on the surface of the aluminum substrate and the thickness of the metal/alloy layer is 5-25 nm.

Preferably, the aluminum substrate can be a pure aluminum substrate, an aluminized substrate or an aluminum alloy substrate.

Preferably, a pulse voltage is applied to the aluminum substrate for 30-500 seconds during the first anodizing process. The pulse voltage can be positive voltage ranging from 30 V to 120 V or negative voltage ranging from −2 V to −4 V.

Preferably, during the photolithography, coat a photoresist on the aluminum substrate with the first AAO and then soft bake at 70° C. for 1 minute for removal of a part of solvents. A pattern is transferred from a photomask to the photoresist and next the photoresist is hard baked at 120° C. for 1 minute to remove any residual solvents. A developer solution is used for washing away the exposed photoresist if the photoresist is the positive photoresist. Once the photoresist is the negative photoresist, the developer solution is used for washing away the unexposed photoresist.

Preferably, a pulse voltage is applied to the aluminum substrate for 30-500 seconds during the second anodizing process. The pulse voltage can be positive voltage ranging from 30 V to 120 V or negative voltage ranging from −2 V to −4 V.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein"

DETAILED DESCRIPTION OF THE PREFERRED EMBODIMENT

In order to learn functions and features of the present invention, please refer to the following embodiments and related figures.

Figure 1:
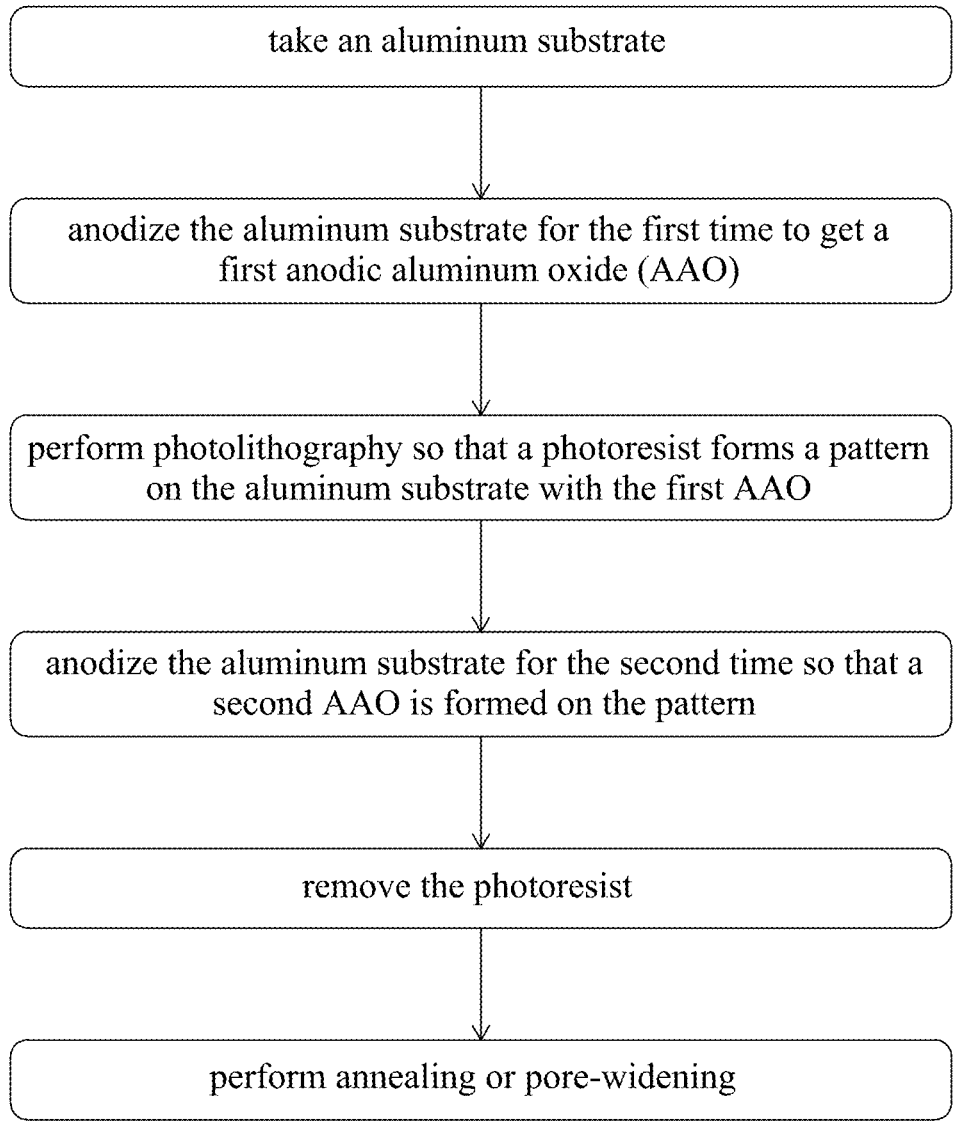
FIG. 1 is a flow chart showing steps of an embodiment according to the present invention.
Figure 2:
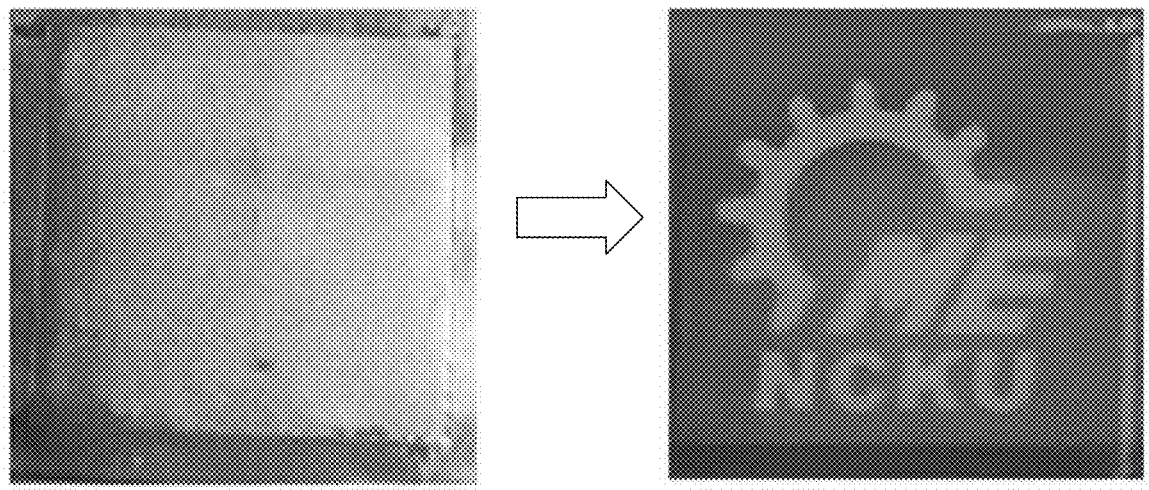
FIG. 2 shows an aluminum substrate on which a pattern is made visible when illuminated with light according to an embodiment of the present invention.
Figure 3:
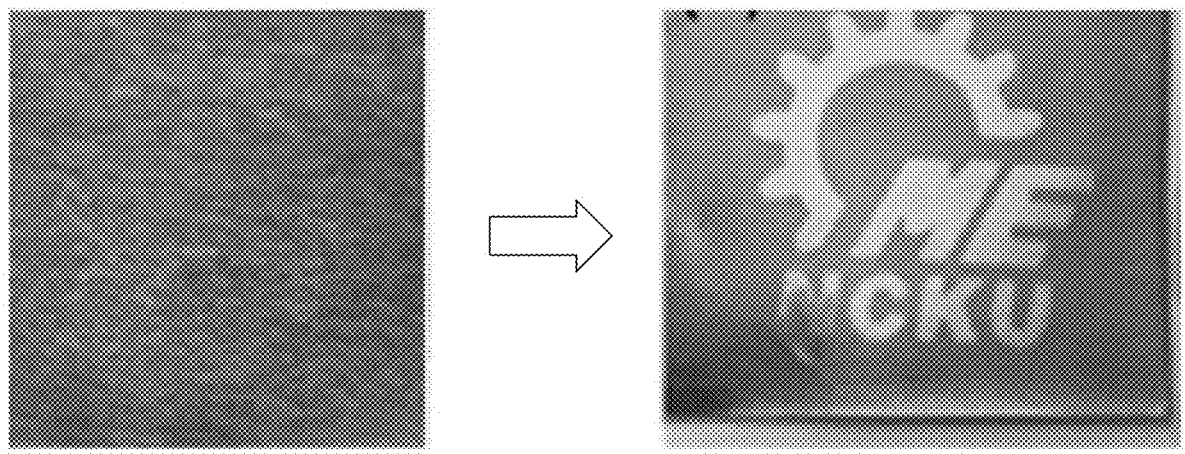
FIG. 3 shows an aluminum substrate on which a pattern becomes visible after droplet addition according to an embodiment of the present invention.

Refer to FIG. 1, a method for preparing invisible anodic aluminum oxide (AAO) patterns according to the present invention includes the following steps. Step 1: taking an aluminum substrate such as a pure aluminum substrate, an aluminized substrate or an aluminum alloy substrate. Step 2: anodizing the aluminum substrate for the first time. During the anodizing process, a pulse voltage is applied to the aluminum substrate for 30-500 seconds to form a first anodic aluminum oxide (AAO). The pulse voltage can be positive voltage ranging from 30 V to 120 V or negative voltage ranging from −2 V to −4 V. Step 3: perform photolithography. Coat a photoresist on the aluminum substrate with the first anodic aluminum oxide and then soft bake at 70 degrees Celsius (70° C.) for 1 minute to remove a part of solvents. A pattern is transferred from a photomask to the photoresist and next the photoresist is hard baked at 120° C. for 1 minute for removing any residual solvents. A developer solution is used to wash away the exposed photoresist if the photoresist is the positive photoresist. If the photoresist is the negative photoresist, the developer solution is used for washing away the unexposed photoresist. Thereby the photoresist forms a pattern on the aluminum substrate. Step 4: anodizing the aluminum substrate for the second time. During the anodizing process, a pulse voltage is applied to the aluminum substrate for 30-500 seconds to form a second anodic aluminum oxide (AAO). The pulse voltage can be positive voltage ranging from 30 V to 120 V or negative voltage ranging from −2 V to −4 V. Thus the pattern becomes invisible. The invisible pattern is further treated by annealing or pore-widening so that it can be later made visible. The invisible pattern treated by annealing can be made visible by ultraviolet (UV) light, as shown in FIG. 2. The invisible pattern treated by pore-widening can be rendered visible by droplet addition, as shown in FIG. 3.

The annealing is carried out in an annealing furnace at a temperature between 200° C. and 500° C. for 3-6 hours. The preferred annealing temperature is 400° C. and the preferred annealing time is 3 hours. During the pore-widening, the aluminum substrate is immersed in a 1 wt %-20 wt % phosphoric acid solution at a temperature of 10° C.-45° C. Thus the second AAO without being covered with the photoresist is treated by pore-widening for 30-1800 seconds. After the pore-widening process, a layer of metal or alloy whose reflectivity is higher than 70% is electroplated on a surface of the aluminum substrate. The metal and the alloy can be selected from the group consisting of platinum (Pt), aluminum (Al), silver (Ag), gold (Au), iron (Fe), nickel (Ni), cobalt (Co), chromium (Cr), titanium (Ti), tantalum, (Ta), copper (Cu) or their combinations. The thickness of the metal/alloy layer is ranging from 5 nm to 25 nm.

The following embodiments show applications of the present invention.

Refer to FIG. 1, first prepare an aluminum substrate such as a pure aluminum substrate, an aluminized substrate or an aluminum alloy substrate. Or the substrate can be made from other materials, not limited to the materials mentioned above.

The aluminum substrate is anodized for the first time at a temperature between −5° C. and 35° C. The first anodizing is carried out by means of a three-electrode potentiostat/galvanostat for electrochemical experiments (Jiehan 5000, Taiwan). In the three-electrodes, a platinum mesh is used as the counter electrode and an aluminum disk is used as the working electrode while the reference electrode is Ag/AgCl. During the first anodizing, a pulse voltage is applied to the aluminum substrate for 300 seconds and 0.3 M oxalic acid solution is used as the electrolyte. The aluminum is placed into the electrolyte and then the positive voltage 40 V and the negative voltage −2 V are applied in turn. The operation period is 2 seconds. That means 1 second for the part with positive pulse and 1 second for the part with negative pulse to form a first anodic aluminum oxide (AAO) on the aluminum substrate.

Perform a photolithography process. A photoresist is coated on the aluminum substrate with the first AAO by spin coating. In this embodiment, the photoresist used is S1813, a positive photoresist. Then the photoresist is soft baked at 70° C. for 1 minute to drive off a part of solvents. A photomask with specific pattern is set over the photoresist. Then the photomask is on exposure to a 400 W ultraviolet (UV) light with the wavelength of 325 nm for 6 seconds and development for 10 seconds. Next the photoresist is subjected to hard bake at 120° C. for 1 minute for complete removal of the solvents. A developer solution is used for removal of the exposed photoresist and a pattern is formed on the aluminum substrate.

After patterning, the aluminum substrate is anodized for the second time at a temperature between −5° C. and 35° C. A three-electrode potentiostat/galvanostat for electrochemical experiments (Jiehan 5000, Taiwan) is used to perform the anodizing process. A platinum mesh is used as the counter electrode and an aluminum disk is used as the working electrode while the reference electrode is Ag/AgCl. During the second anodizing process, a pulse voltage is applied to the aluminum substrate for 180 seconds and 0.3 M oxalic acid solution is used as the electrolyte. The aluminum is mounted into the electrolyte and then the positive voltage 40 V and the negative voltage −2 V are applied in turn. The operation period is 2 seconds. That means 1 second for the part with positive pulse and 1 second for the part with negative pulse. The second AAO is only formed within the area defined by the photoresist so that the second AAO is formed on the pattern and the pattern becomes invisible. Then the photoresist is washed away and only the second AAO pattern is left. The invisible pattern can become visible after being illuminated with UV light.

Moreover, the invisible pattern can be treated by annealing or pore-widening to be made visible later. The aluminum substrate with the invisible pattern is placed into a 400° C. annealing furnace for 3 hours. After the annealing, the invisible pattern is exposed to UV light to be made visible. Compared with the invisible pattern without being treated by the annealing process, the invisible pattern treated by the annealing is rendered visible much better. As show in FIG. 2, the aluminum substrate is immersed in a 5 wt % phosphoric acid solution at 35° C. for 8 minutes. Thus the second AAO without being covered with the photoresist is treated by pore-widening. After the pore-widening process, a layer of metal or alloy whose reflectivity is higher than 70% is electroplated on the surface of the aluminum substrate. The metal and the alloy can be selected from the group consisting of platinum (Pt), aluminum (Al), silver (Ag), gold (Au), iron (Fe), nickel (Ni), cobalt (Co), chromium (Cr), titanium (Ti), tantalum, (Ta), copper (Cu) or their combinations. The thickness of the metal/alloy layer is between 5 nm and 25 nm and the metal/alloy layer is used to improve (enrich) color saturation of the invisible pattern being displayed. The invisible pattern treated by pore-widening can be seen after droplet addition, as shown in FIG. 3.

In summary, the present invention has the following advantages compared with the techniques available now.

1. The aluminum substrate has been anodized for two times in the present method. After the second anodizing process, the second AAO is formed within the area defined by the positive photoresist so that the pattern generated becomes invisible for information hiding.

2. The invisible pattern formed is further treated by annealing or pore-widening so that the pattern can be made visible with UV radiation or droplet addition. The pattern can be rendered visible more obviously.

3. The invisible patterns prepared by the present method can be used for information protection. The important information is hidden and protected by the present invention. The present invention can also be used for anti-counterfeiting purposes. The anti-counterfeiting labels should be invisible for preventing counterfeiters from copying the label.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalent.

What is claimed is:

1. A method for preparing invisible anodic aluminum oxide patterns comprising:
providing an aluminum substrate;
performing a first anodizing of the aluminum substrate to form a first anodic aluminum oxide (AAO) on a surface of the aluminum substrate, said first AAO having a first anodized surface;
defining a pattern on the first AAO by performing photolithography, said pattern having a first portion of the first AAO covered with a photoresist and a second portion of the first AAO free of the photoresist;
performing a second anodizing of the second portion of the first AAO free of the photoresist on the aluminum substrate to form a second AAO on the first AAO, said second AAO having a second anodized surface;
removing the photoresist from and exposing said first portion of the first AAO, thus establishing a first operational mode having said second anodized surface of the second AAO forming an invisible pattern with said first portion of the first AAO exposed upon removal of the photoresist; and
transferring said first operational mode into a second operational mode wherein the invisible pattern is rendered visible by at least one operational process selected from a group consisting of:
(a) annealing said invisible pattern, and subsequently exposing the annealed invisible pattern, to ultraviolet (UV) light; or
(b) treating said invisible pattern by pore-widening, and subsequently performing droplet addition on the pore-widened invisible pattern.

2. The method as claimed in claim 1, further comprising: performing the annealing of said invisible pattern in an annealing furnace at a temperature ranging between 200 degrees Celsius (° C.) and 500° C. for a duration of 3-6 hours.

3. The method as claimed in claim 2, further comprising: performing the annealing of said invisible pattern at the temperature of 400° C. for a duration of 3 hours.

4. The method as claimed in claim 1, further comprising: during the pore-widening, immersing the aluminum substrate in a phosphoric acid solution.

5. The method as claimed in claim 4, wherein, during the pore-widening, the concentration of the phosphoric acid solution ranges from 1 wt % to 20 wt %, and the temperature of the phosphoric acid solution ranges from 10° C. to 45° C., and
the duration of the pore-widening of the invisible pattern ranges between 30 seconds and 1800 seconds.

6. The method as claimed in claim 1, further comprising: electroplating a layer of a metal on the surface of the aluminum substrate after the pore-widening, wherein the metal is selected from the group consisting of platinum (Pt), aluminum (Al), silver (Ag), gold (Au), iron (Fe), nickel (Ni), cobalt (Co), chromium (Cr), titanium (Ti), tantalum, (Ta), copper (Cu), or a combination thereof.

7. The method as claimed in claim 1, further comprising: electroplating a layer of metal or alloy with a reflectivity higher than 70% is on the surface of the aluminum substrate, wherein the thickness of the layer ranges from 5 nm to 25 nm.

8. The method as claimed in claim 1, wherein the aluminum substrate is selected from the group consisting of a pure aluminum substrate, an aluminized substrate and an aluminum alloy substrate.

9. The method as claimed in claim 1, further comprising: applying a pulse voltage to the aluminum substrate for 30-500 seconds during the first anodizing, the pulse voltage being selected from a group consisting of a positive voltage ranging from 30 V to 120 V or a negative voltage ranging from −2 V to −4 V.

10. The method as claimed in claim 1, wherein the performance of the photolithography includes:
coating the photoresist on the aluminum substrate;
soft baking the photoresist at 70° C. for 1 minute;
applying a photomask to the photoresist to define exposed and unexposed areas of the photoresist;
hard baking the photoresist at 120° C. for 1 minute; and
applying a developer solution to wash away one of the exposed area of a positive photoresist or the unexposed area of a negative photoresist.

11. The method as claimed in claim 1, further comprising: applying a pulse voltage to the aluminum substrate for 30-500 seconds during the second anodizing, the pulse voltage being selected from a group consisting of a positive voltage ranging from 30 V to 120 V or a negative voltage ranging from −2 V to −4 V.

* * * * *